United States Patent

Morizono et al.

[11] Patent Number: 5,500,246
[45] Date of Patent: Mar. 19, 1996

[54] RESIN COMPOSITION FOR WATER-BASED COATING AND WATER-BASED COATING COMPOSITION

[76] Inventors: Kenichi Morizono; Taira Harada, both c/o Mitsui Petrochemical Industries, Ltd., No. 3, Chigusakaigan, Chiba 299-01, Japan

[21] Appl. No.: 290,827

[22] PCT Filed: Dec. 21, 1993

[86] PCT No.: PCT/JP93/01844

§ 371 Date: Aug. 18, 1994

§ 102(e) Date: Aug. 18, 1994

[87] PCT Pub. No.: WO94/14905

PCT Pub. Date: Jul. 7, 1994

[30] Foreign Application Priority Data

Dec. 22, 1992 [JP] Japan .................... 4-342642

[51] Int. Cl.$^6$ ..................... B05D 7/22
[52] U.S. Cl. ............. 427/239; 427/386; 427/388.1; 523/404; 525/108; 525/109; 525/119
[58] Field of Search ............ 523/404; 525/119, 525/109, 108; 427/239, 386, 388.1

[56] References Cited

U.S. PATENT DOCUMENTS

| | | | |
|---|---|---|---|
| 3,294,865 | 12/1966 | Price | 525/119 |
| 4,302,373 | 11/1981 | Steinmetz | 525/119 |
| 4,579,888 | 4/1986 | Kodama et al. | |
| 4,963,602 | 10/1990 | Patel | |

FOREIGN PATENT DOCUMENTS

| | | |
|---|---|---|
| 0006334 | 1/1980 | European Pat. Off. |
| 0204511 | 12/1986 | European Pat. Off. |
| 0232021 | 8/1987 | European Pat. Off. |
| 55-3481 | 1/1980 | Japan |
| 60-215016 | 10/1985 | Japan |
| 1-96263 | 4/1989 | Japan |
| 4-293932 | 10/1992 | Japan |
| 4285636 | 10/1992 | Japan |

*Primary Examiner*—Melvyn I. Marquis
*Assistant Examiner*—D. Aylward

[57] ABSTRACT

A water-based coating composition that does not use an organic solvent is formed by dispersing a resin composition into an aqueous medium. The water-based coating composition has excellent stability over time. The coating film obtained from the composition has excellent retort resistance, adhesion to metals, processability and chemical resistance; and it can be cured at relatively low temperatures. The resin composition consists essentially of:

(1) a reaction product (C) of an aromatic polyol resin (A-1) and a carboxyl group-containing acrylic resin (B);

(2) an aromatic epoxy resin (D); and (3) an aromatic polyol resin (A-2); wherein said aromatic polyol resin (A-1) and said aromatic polyol resin (A-2), which may be the same or different, are obtained by capping the epoxy group of an aromatic epoxy resin, the weight ratio of component (A-1) to component (B) satisfying the following expression (I), and the proportion of component (D) and component (A-2) satisfying the following expressions (II) and (III) based on 100 parts by weight of the resin mixture:

$$85/15 \geq (A\text{-}1)/B \geq 15/85 \quad \text{(I)}$$

$$1 \leq (D)+(A\text{-}2) \leq 80 \quad \text{(II)}$$

$$1 \leq (D) \leq 80 \text{tm} \quad \text{(III)}.$$

12 Claims, No Drawings

5,500,246

RESIN COMPOSITION FOR WATER-BASED COATING AND WATER-BASED COATING COMPOSITION

DETAILED DESCRIPTION OF THE INVENTION

1. Industrial Field of the Invention

This invention relates to a resin composition for water-based coating which comprises an aromatic polyol resin and an aromatic epoxy resin as main components, and to a water-based coating composition. More specifically, the invention relates to a resin composition for water-based coating and a water-based coating composition capable of forming an excellent coating film as a coating composition for metals, particularly coating for the inner surface of a can and precoat metal (PCM) coating.

2. Prior Art and its Problem

In the case of solvent-based coatings which use an organic solvent, the use of an organic solvent is now being restricted more than before from a viewpoint of resource and energy saving and environmental preservation. For this reason, it is desired to shift to coatings which use a water-based solvent.

Particularly, epoxy resin coatings have been mainly studied to shift can coating for coating metal surfaces, precoat metal (PCM) coating and corrosion-resistant coating to coating using a water-based solvent. Various methods for improving the water solubility of epoxy-resins have been proposed.

For example, Japanese Patent Laid-Open Publication Nos.1228/1978 and 1285/1978 disclose a method which comprises the steps of polymerizing an acrylic monomer including a carboxyl group-containing monomer using a radical initiator such as benzoyl peroxide in the presence of an epoxy resin, grafting from the aliphatic hydrocarbon site of the epoxy resin, and dispersing the resulting polymer into water using a basic compound such as ammonium and amine.

However, the method described above has the defects that it is necessary to enhance graft ratio to achieve a highly stable emulsion and that a large volume of radical initiator such as benzoyl peroxide which is expensive and involves high risk of explosion must be used at the time of production.

To solve the above problems, Japanese Patent Laid-Open Publication No.3481/1980 discloses a method which comprises the steps of esterifying a carboxyl group-containing vinyl polymer with an epoxy group of an epoxy resin in the presence of an amine-based esterifying catalyst to achieve an epoxy resin modified by the carboxyl group-containing vinyl polymer and having substantially no epoxy group, neutralizing the resulting epoxy resin with a base, and dispersing the epoxy resin into water.

However, since a reaction is continued until the epoxy group of the epoxy resin is perfectly consumed in the method described above, the higher molecular weight and high crosslinking of the resin cannot be avoided. Particularly, can coating is inferior in the hardness of its coating film and flexibility that can stand processing and hence, has a problem with the processability of its coating film.

In addition, when these compositions are used in coating for the inner surface of a can, a low-molecular weight compound derived from an epoxy resin and an acrylic resin as main components elutes into the contents of the can, thus causing a food sanitary problem. Furthermore, to prevent the elution of such a low-molecular weight compound, it is necessary to perfectly harden the coating film. For this purpose, it is necessary to bake it at a high temperature. Therefore, the method has the problems that a large amount of energy is required for baking and baking speed becomes slow.

The inventors recognized the defects of the above prior arts, and invented and as a water-based coating that can overcome these defects, previously proposed a composition for water-based coating (Japanese Patent Laid-Open Publication No.285,636/1992), which comprises an ammonium salt and/or an amine salt of a reaction product (C) between an aromatic polyol resin (A) and a carboxyl group-containing acrylic resin (B), the weight ratio of component (A) to component (B) being in the range from 95/5 to 5/95 in terms of solid content.

PROBLEM TO BE SOLVED BY THE INVENTION

The present inventors have further conducted studies to develop a water-based coating which retains the excellent properties of the above-described invented water-based coating and yet has improved characteristics such as chemical resistance and processability.

A first object of the invention is therefore to provide a resin composition for water-based coating for metals, which is capable of forming an excellent coating film having stability after an elapse of time.

A second object of the invention is to provide a resin composition for water-based coating which is capable of curing a coating film on a metal surface at a low temperature.

A third object of the invention is to provide a resin composition for water-based coating which has a small content of a low-molecular weight component after the formation of a coating film and whose cured coating film is excellent in adhesion to a metal substrate.

Another object of the invention is to provide a resin composition for water-based coating which is capable of forming a coating film having excellent chemical resistance and processability.

A further object of the invention is to provide a resin composition for water-based coating which is capable of forming a coating film having excellent stability to a retort treatment.

A further object of the invention is to provide a water-based coating composition for forming a coating film having the above-described excellent properties.

MEANS FOR SOLVING THE PROBLEM

According to the studies conducted by the inventors, an object of the invention is to provide a resin composition for water-based coating which is a resin mixture consisting essentially of:
(1) a reaction product (C) between an aromatic polyol resin (A-1) and a carboxyl group-containing acrylic resin (B);
(2) an aromatic epoxy resin (D); and
(3) an aromatic polyol resin (A-2), the weight ratio of component (A-1) to component (B) satisfying the following expression (I) and the proportions of component (D) and component (A-2) in terms of the total weight of the resin mixture being 100 satisfying the following expressions (II) and (III).

$$85/15 \geq (A\text{-}1)/(B) \geq 15/85 \quad (I)$$

$$1 \leq (D)+(A-2) \leq 80 \quad \text{(II)}$$

$$1 \leq (D) \leq 80 \quad \text{(III)}$$

According to the present invention, there is provided a water-based coating composition which comprises the above-mentioned resin composition for water-based coating and an aqueous medium.

The present invention is described in detail hereinunder.

The resin composition for water-based coating of the present invention is a resin composition which comprises component C and component D as essential resin components and further component (A-2) as required. Each of these components is described first.

Component C is a reaction product between an aromatic polyol resin (A-1) and a carboxyl group-containing acrylic resin (component B). In this instance, the aromatic polyol resin (A-1) is selected from substantially the same group as the aromatic polyol resin (A-2) which is added to the resin composition of the invention as required. Component (A-1) may be the same as or different from component (A-2). Therefore, in the present invention, component (A-1) and component (A-2) may be sometimes referred collectively to as "component A".

The aromatic polyol resin as component A (which refers to component (A-1) and component (A-2) as described above) suitably has a number average molecular weight of 350 to 40,000, preferably 1,000 to 10,000, and contains in one molecule an average of 0.01 to 4.0, preferably 0.2 to 3.0, primary hydroxyl groups and an average of 2 or more, preferably 4.0 to 30.0, secondary hydroxyl groups. The aromatic polyol resin which contains substantially no epoxy group in the molecule is more advantageous.

The aromatic polyol resin as the above component A is obtained by modifying the epoxy group of the aromatic epoxy resin with an end capping agent. The aromatic epoxy resin as a source material for the aromatic polyol resin is not limited specifically provided that it contains an aromatic hydrocarbon skeleton in a resin skeleton. Preferred examples of the aromatic epoxy resin includes a bisphenol A type epoxy resin, a bisphenol F type epoxy resin and a novolak type epoxy resin.

These aromatic epoxy resins as a source material usually contain an average of 1.1 to 2.0 epoxy groups in one molecule and have a number average molecule weight of not less than 700, preferably not less than 1400.

The capping agent used for modifying the aromatic epoxy resin is intended to cap the epoxy group of the aromatic epoxy resin and is exemplified by phenols, carboxylic acids, primary amines, secondary amines, mercaptans, alcohols and water.

These capping agents have a reactive hydrogen atom, but the invention is not limited to these. Capping agents having no reactive hydrogen atom, such as alkyl halide, Grignard reagents and nucleophilic reagents such as alkyl lithium may be also readily used. Examples of phenols used as the capping agents include bisphenol A, alkyl monophenol and resorcinol.

Examples of carboxylic acids used as the capping agents include monocarboxylic acid compounds such as benzoic acid, palmitic acid, lauric acid, myristic acid and stearic acid; animal and vegetable oil fatty acid such as castor oil fatty acid, soybean oil fatty acid, tall oil fatty acid, linseed oil fatty acid and cotton seed oil fatty acid; and polycarboxylic acid compounds such as glutaric acid, maleic acid, adipic acid, succinic acid, trimellitic acid, pyromellitic acid, glycolic acid and tartaric acid.

Examples of primary amines and secondary amines include hydroxylamines such as ethanolamine and diethanolamine; and alkylamines such as propylamine, ethylamine, dipropylamine and diethylamine.

When it is necessary to increase the molecular weight of the aromatic epoxy resin, it is effective to use phenols, particularly bisphenol A, as a capping agent. Use of an excess amount of bisphenol A with respect to the concentration of the epoxy group of an epoxy resin as a source material makes it possible to increase the molecular weight and cap the epoxy group of the epoxy resin.

When it is not necessary to increase the molecular weight, it is effective to use a monocarboxylic acid compound or a primary or secondary amine because they have high reactivity to an epoxy group.

The capping agents may be used alone or in combination of two or more.

It is important to suitably select the kind and amount of the capping agent so that the molecular weight of the aromatic polyol resin [Component A], the amount of the primary hydroxyl group, the amount of the secondary hydroxyl group and the amount of the epoxy group can meet the above-described ranges because the kind and amount of the capping agent affect these. Particularly, when no epoxy group is substantially present in component A, it is possible to control gelation which is caused by an excessive proceeding of the reaction between the epoxy group and the carboxyl group in the reaction between component A and component B. And further, even when the amount of the primary hydroxyl group contained in component A is in the above-described range, the generation of microgels having a mesh structure due to an excessive proceeding of the esterification reaction can be prevented.

As described in the foregoing, component C in the present invention is a reaction product between the aromatic polyol resin as component A and the carboxyl group-containing acrylic resin as component B. This component B is desired to have a number average molecular weight of 300 to 60,000, preferably 400 to 20,000, and its resin having an acid value of 25 to 450, preferably 200 to 350, in terms of solid content is advantageous. Component B having a number average molecular weight in the above-described range makes it possible to form a coating film having appropriate crosslink density and excellent processability and does not cause gelation upon its reaction with the aromatic polyol resin.

The carboxylic group-containing acrylic resin as the component B can be obtained by polymerizing (1) a carboxylic group-containing vinyl monomer, (2) an aromatic vinyl monomer and (3) at least one monomer selected from the group consisting of alkyl esters, hydroxyalkyl esters and N-hydroxyalkyl amides of $\alpha,\beta$-ethylenic unsaturated carboxylic acid. The monomer or monomers are selected from those listed above and used in combination to satisfy the polymerization degree and acid value of the above component B. The polymerization is carried out in an organic solvent at a temperature of 60° C. to 170° C., using a generally used radical polymerization initiator such as azobisisobutyronitrile and benzoyl peroxide.

Specific examples of the monomer or monomers used for the polymerization of the above-mentioned component B are given below:

(1) Specific examples of the carboxyl group-containing vinyl monomers include acrylic acid, methacrylic acid, crotonic acid, itaconic acid, maleic acid and fumaric acid;

(2) Specific examples of the aromatic vinyl monomers include styrene, vinyltoluene and styrene-based monomers including 2-methylstyrene, t-butylstyrene and chlorostyrene; and (3) Specific examples of the alkyl esters of α,β-ethylenic unsaturated carboxylic acid include alkyl esters of acrylic acid having 1 to 12 carbons, such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, n-octyl acrylate, decyl acrylate, dodecyl acrylate and diethyl aminoethyl acrylate; and alkyl esters of methacrylic acid having 1 to 12 carbons such as methyl methacrylate, propyl methacrylate, n-butyl methacrylate, isobutyl methacrylate, n-amyl methacrylate, isoamyl methacrylate, n-hexyl methacrylate, 2-ethylhexyl methacrylate, n-octyl methacrylate, decyl methacrylate, dodecyl methacrylate and glycidyl methacrylate.

Examples of hydroxyalkyl esters of α,β-ethylenic unsaturated carboxylic acid include hydroxyalkyl esters (having 1 to 5 carbons) such as hydroxyethyl acrylate, hydroxypropyl acrylate, hydroxyethyl methacrylate and hydroxypropyl methacrylate.

Further, examples of N-hydroxyalkyl amides of α,β-ethylenic unsaturated carboxylic acid include N-substituted (meth)acrylic monomers such as N-methylol (meth)acrylamide and N-butoxymethyl (meth)acrylamide.

As a monomer for obtaining the resin of the above-described component B, it is desirable that the carboxyl group-containing vinyl monomer is contained in an amount of at least 25% by weight, preferably 25 to 75% by weight, of the total amount of monomers. When the carboxyl group-containing monomer is contained in the above-described range, the dispersion stability of the composition of the present invention in an aqueous medium is good. When the composition is coated, its coating film has excellent solvent resistance, and yet when it is coated on the inner surface of a can, its coating film provides a good flavor retention. Furthermore, the viscosity of a copolymer at the time of production makes it easy to produce an appropriate resin, and the coating film of the resin composition of the invention has high water resistance. Particularly, when a coating film is formed on the inner surface of a can, blanching does not occur on the coating film after retort treatment.

Component C is produced from a reaction between the above-described components A and B. This reaction is preferably carried out in a solvent in the presence or absence of a base catalyst such as ammonia and amines or a Lewis acid catalyst such as tetraalkoxy titanium, tin tetrachloride, and titanium tetrachloride, at a temperature of 100° C. to 200° C. preferably 120° C. to 170° C. Examples of the solvent used include toluene, xylene, dibutyl Cellosolve, isopropyl Cellosolve, butyl Cellosolve, hexyl Cellosolve, diethyl Carbitol and dibutyl Carbitol.

It is desirable that components A and B used for producing component C in the present invention are selected so that an esterification reaction between the primary hydroxyl group contained in the aromatic polyol resin (component A) and the carboxylic group contained in the carboxyl group-containing acrylic resin (component B) becomes a main reaction. For this reason, it is advantageous to carry out the reaction at relatively high temperatures. When the reaction temperature is in the above-described range, the reaction proceeds in a practical range of a reaction time and consequently, a side reaction between the secondary hydroxyl group contained in component A and the carboxyl group contained in component B does not proceed, thus rarely causing gelation.

The proceeding of the reaction between components A and B can be controlled to a desired extent by measuring a reduction in acid value and molecule weight distribution by means of gel permeation chromatography.

The solid content weight ratio of component A to component B contained in the reaction product (component C) is selected from the range from 85/15 to 15/85, preferably from 80/20 to 40/60.

Component D used to form the resin composition for water-based coating of the present invention is an aromatic epoxy resin having a number average molecular weight of 350 to 40,000, preferably 700 to 20,000, most preferably 1,400 to 10,000. Preferably, component D usually contains an average of 1.1 to 2.0 epoxy groups in one molecule.

The resin of component D may be an epoxy resin having a skeleton of aromatic hydrocarbon. Specific examples include a bisphenol A type epoxy resin, a bisphenol AD type epoxy resin, a bisphenol F type epoxy resin and a novolak type epoxy resin.

The resin composition for water-based coating of the present invention comprises component C (a reaction product between component A-1 and component B) and component D as essential ingredients and further component A (component A-2) as required. The weight ratio of component A-1 to component B contained in component C is in the range that satisfies the following expression (I), preferably the following expression (I').

$$85/15 \geqq (A-1)/(B) \geqq 15/85 \qquad (I)$$

$$80/20 \geqq (A-1)/B \geqq 40/60 \qquad (I')$$

The proportion of the total weight of component D and component A-2 contained in the resin composition of the invention is in the range that satisfies the following expression (II), preferably the following expression (II'), when the total weight of the resins is 100.

$$1 \leqq (D)+(A-2) \leqq 80 \qquad (II)$$

$$30 \leqq (D)+(A-2) \leqq 70 \qquad (II')$$

Meanwhile, the proportion of component D is in the range that satisfies the following expression (III), preferably the following expression (III').

$$1 \leqq (D) \leqq 80 \qquad (III)$$

$$20 \leqq (D) \leqq 70 \qquad (III')$$

Furthermore, although the proportion of component C is calculated from the above expression (II), it is in the range that satisfies the following expression (IV), preferably the following expression (IV').

$$20 \leqq (C) \leqq 99 \qquad (IV)$$

$$30 \leqq (C) \leqq 70 \qquad (IV')$$

Component (A-2) may not be used, but is usually contained in the range that satisfies the following expression (V), preferably the following expression (V').

$$0 \leqq (A-2) \leqq 50 \qquad (V)$$

$$0 \leqq (A-2) \leqq 30 \qquad (V')$$

In the resin composition of the invention, as described above, the ratio of the carboxyl group-containing acrylic resin (component B) to the total weight of all resins can be reduced by adding the aromatic epoxy resin (component D) and as required the aromatic polyol resin (component A-2) to component C and mixing them. In consequence, the number of free carboxyl groups after curing decreases and the gel content percentage arises. Due to these, a coating film formed from the resin composition of the invention is superior in water resistance and chemical resistance and has improved physical properties such as the suppression of blanching on the coating film after retort treatment such as boiling.

When the carboxylic groups are excessively contained in the resin composition of the invention, the carboxylic groups are preferably converted into ammonium salts or amine salts using ammonia or amines. Preferably, ammonia or amine is added in such an amount that a final composition can have pH of 5 to 11.

In this instance, examples of the amine which can be used in the invention include alkyl amines such as ethylamine, butylamine, diethylamine, dibutylamine, triethylamine and butylamine; alcohol amines such as 2-dimethylamino ethanol, diethanolamine, triethanolamine, aminomethylpropanol, dimethylaminomethylpropanol; and morpholine. Polyamines such as ethylenediamine and diethylenetriamine may also be used.

The resin composition of the invention is added to an aqueous medium and dispersed into the aqueous medium for use as a water-based coating composition. In this instance, the aqueous medium is water alone or a mixture comprising at least 10% by weight of water and a hydrophilic organic solvent. Preferred examples of the hydrophilic organic solvent include alkyl alcohols such as methanol, ethanol, n-propanol, isopropanol, n-butanol, secondary butanol, tertiary butanol, isobutanol and 3-methyl-3-methoxybutanol; ether alcohols such as methyl Cellosolve, ethyl Cellosolve, propyl Cellosolve, butyl Cellosolve, hexyl Cellosolve, methyl Carbitol, ethyl Carbitol, ethylene glycol, diethylene glycol, triethylene glycol and hexylene glycol; ether esters such as methyl Cellosolve acetate and ethyl Cellosolve acetate; dioxane; dimethyl formamide; and diacetone alcohol.

The weight ratio of the resin composition to the aqueous medium is suitably in the range of 5/95 to 50/50, preferably from 10/90 to 40/60.

The resin composition for water-based coating of the present invention may be used as a water-based coating when it is mixed with a pigment. Various types of known pigments may be used as the pigment used in the invention. The resin composition of the invention may be mixed with a curing agent such as aqueous amino plast resins including hexamethoxymethyl melamine, methylol benzoguanamine and methylol urea resins, and phenol resins, or a surfactant and antifoamer for improving coating for use as a coating as far as it does not impair the above-mentioned characteristics of a water-based coating.

As a substrate to be applied by the water-based coating of the invention, metal plates such as untreated steel plates, zinc-iron plates and tin plates are suitably used. Preferred coating techniques include spray coating such as air spray, airless spray and electrostatic spray coatings are preferred, and immersion coating, roll coater coating and electrodeposition coating can be also employed. The baking condition may be selected from the temperature range of approximately from 150° C. to 240° C. and the baking time range of approximately from 2 to 30 minutes.

According to the present invention, there is provided a resin composition for water-based coating which contains no organic solvent. A water-based coating comprising this composition is excellent in stability after an elapse of time and a coating film obtained from the coating has the advantage that it is excellent in retort resistance, adhesion to metals, processability and chemical resistance, and can be cured at relatively low temperatures.

EXAMPLES

The invention will be explained by Examples and Comparative Examples. "Parts" and "%" used in the Examples and Comparative examples means "parts by weight" and "% by weight", respectively. Throughout the Examples and Comparative examples, coatings or coated plates were evaluated according to the following methods or standards except that methods or standards were specified.

(1) Preparation of coated plate

A resol resin was added to and mixed with a water-based coating in a solid content weight ratio of the water-based coating resin to the resol resin of 95:5 to prepare a varnish. This varnish was applied to the surface of a tin plate (JIS G 3303) of 0.3 mm in thickness by a No.30 bar coater and then baked for 5 minutes at 200° C. to cure the coating. The thickness of the coating film was set at approximately 6 to 10 μm.

(2) Retort resistance

Part of this coated plate was boiled for 30 minutes at 125° C. to check the existence of blanching of the coating film caused by retort treatment. Similarly, the adhesion of the coating film after boiling was checked.

(3) Adhesion

The surface of the coating film was cut vertically and horizontally by a knife into a matrix of 12×12 squares with a width of about 1 mm. A 24 mm-wide cellophane adhesive tape was adhered to the surface of this coating film and the number of squares not peeled off when the tape was removed strongly from the coating film was indicated as the number of numerator. Separately, the coating film not cut into a matrix was evaluated in the same manner.

(4) Processability

The coated plate was folded into two by a mandrel testing apparatus, and one or two plates (indicated by 0T, 1T and 2T, respectively) were inserted between the two folded parts as required, and further bent by a manual press molding machine at a pressure of 15 Kg/cm². The folded plate was unfolded, adhered by an adhesive tape (cellophane tape) and evaluated according to the following count table depending on the condition of the remaining coating film when the tape was removed strongly from the coating film.

| 0 point | 0% remained |
|---------|-------------|
| 1 point | 20% remained |
| 2 points | 40% remained |
| 3 points | 60% remained |
| 4 points | 80% remained |
| 5 points | 100% remained |

(5) Corrosion resistance

A test piece prepared by cutting a cross on the surface of the coating film was immersed into a 1% saline solution for 1 hour at 125° C. to check the degree of corrosion around the cross.

| no change | ⊙ |
|-----------|---|
| slightly corroded | o |
| considerably corroded | Δ |
| wholly corroded | x |

(6) Gel content percentage

A treated plate obtained was immersed into an MEK (methyl ethyl ketone) 1500 times the weight of the coating film, and refluxed for 60 minutes at 80° C. to measure its gel content percentage.

gel content percentage (%) in MEK extraction =

$$\left( \frac{W1 - W2}{W1 - W0} \right) \times 100$$

W0: weight of uncoated tin plate
W1: weight of coated and baked tin plate
W2: weight of coated tin plate after MEK extraction and drying for 30 minutes at 80° C.

EXAMPLE 1

(i) Preparation of an aromatic polyol resin solution

A four-neck flask replaced with a nitrogen gas was charged with 1,000 parts of bisphenol A type epoxy resin (with a number average molecular weight of approximately 3,200 and an epoxy equivalent of approximately 2,700) and 200 parts of xylene, and gradually heated to elevate the temperature inside the flask up to 120° C. After these materials were stirred for 1 hour until they were completely dissolved, the flask was further heated gradually up to 130° C. When the temperature reached 130° C., 45.2 parts of benzoic acid and 3.8 parts of triethylamine were added and reacted for 6 hours. After the acid value reached 1 or more, xylene was removed under a reduced pressure and the flask was cooled. Thereby, an aromatic polyol resin having an epoxy equivalent of not less than 50,000 was obtained. The aromatic polyol resin had a number average molecular weight of 3,500, an average of not more than 0.07 epoxy groups and an average of about 0.5 primary hydroxyl group in one molecule.

(ii) Preparation of a carboxyl group-containing acrylic resin

A four-neck flask replaced with a nitrogen gas was charged with 500 parts of ethylene glycol monobutyl ether and heated to 150° C. to 160° C. While this temperature was maintained, a uniform solution prepared by mixing 120 parts of styrene, 70 parts of ethyl acrylate and 300 parts of methacrylic acid was dripped into the four-neck flask over 2 hours and further stirred up for 4 hours at that temperature after completion of dripping. Then the resulting reaction solution was added to 2,000 parts of xylene and cooled to room temperature.

Thereafter, a precipitated resin was collected by means of decantation and dried for 6 hours at 150° C. under a reduced pressure to obtain a carboxyl group-containing acrylic resin having a number average molecular weight of approximately 1,000, a carboxylic acid unit of 52% and an acid value of 320.

(iii) Preparation of a resin composition for water-based coating

A four-neck flask replaced with a nitrogen gas was charged with 500 parts of the above-prepared aromatic polyol resin, 500 parts of the above-prepared carboxyl group-containing acrylic resin, 1,250 parts of ethylene glycol monobutyl ether, and 17 g of titanium tetrabuthoxide monomer, and gradually heated to elevate the temperature inside the flask up to 165° C. Thereafter, they were reacted for 6 hours at that temperature, and 1,500 parts of bisphenol A type epoxy resin (with a number average molecular weight of 3,200 and an epoxy equivalent of 2,700) and 1,250 parts of n-butyl alcohol were added to dissolve the resulting reaction product, and cooled to 100° C. Then 254 parts of 2-dimethylamino ethanol was added to the resulting solution, and stirred for 30 minutes at that temperature. Furthermore, 4,746 parts of ion-exchange water was added little by little and stirred using a dispersion mixer. Thus, a semitranslucent dispersion having a solid content of 25%, viscosity of 250 cpc and a particle size of 0.3 μm was obtained. The resulting dispersion was preserved for 6 months at 50° C., but no change was observed. The ratio of component (A-1) to component (B) in the solid content was 1:1 and that of component (C) to component (D) was 2:3.

EXAMPLE 2

Preparation of a composition for water-based coating

A four-neck flask replaced with a nitrogen gas was charged with 1,000 parts of the aromatic polyol resin prepared in Example 1, 500 parts of the carboxyl group-containing acrylic resin prepared in Example 1, 1,250 parts of ethylene glycol monobutyl ether, and 17 g of titanium tetrabuthoxy monomer, and gradually heated to elevate the temperature inside the flask up to 165° C. Thereafter they were reacted for 6 hours at that temperature, and 1,000 parts of bisphenol A type epoxy resin (with a number average molecular weight of 3,200 and an epoxy equivalent of 2,700) and 1,250 parts of n-butyl alcohol were added to dissolve the resulting reaction product and cooled to 100° C. Then 254 parts of 2-dimethylamino ethanol was added and stirred for 30 minutes at that temperature. Furthermore, 6,650 parts of ion-exchange water was added to the mixture little by little, and stirred using a dispersion mixer. Thus, a semitranslucent dispersion having a solid content of 21%, a viscosity of 60 cpc and a particle size of 0.4 μm was obtained. The resulting dispersion was preserved for 6 months at 50° C., but no change was observed. The ratio of component (A-1) to component (B) in the solid was 2:1 and that of component (C) to component (D) was 3:2.

Comparative Example 1

Ethylene glycol monobutyl ether, n-butyl alcohol, 2-dimethylamino ethanol and ion-exchange water were added in the same manner as in Example 1 except that the aromatic polyol resin and the carboxyl group-containing acrylic resin prepared in Example 1 and bisphenol A type epoxy resin were used, and they were only mixed, but not reacted. No water dispersion was obtained.

Comparative Example 2

Ethylene glycol monobutyl ether, n-butyl alcohol, 2-dimethylamino ethanol and ion-exchange water were added to prepare a composition for water-based coating in the same manner as in Example 1 except that 2,000 parts of the aromatic polyol resin prepared in Example 1 and 500 parts of the carboxyl group-containing acrylic resin were used, but bisphenol A type epoxy resin was not used. Thereby, a semitranslucent dispersion having a solid content of 21%, a viscosity of 10 cpc and a particle size of 0.2 μm was obtained. The resulting dispersion was preserved for 6 months at 50° C., but no change was observed. The ratio of component (A-1) to component (B) in the solid content was 4:1 and the content of component (D) was null.

EXAMPLE 3

Preparation of an aromatic polyol resin solution

A four-neck flask replaced with a nitrogen gas was charged with 1,000 parts of bisphenol A type epoxy resin (with a number average molecular weight of 3,200 and an epoxy equivalent of 2,700) and 200 parts of xylene, and gradually heated to elevate the temperature inside the flask up to 120° C. These materials were stirred for 1 hour and completely dissolved and further heated up to 130° C. gradually. After the temperature reached 130° C., 114 parts of castor oil fatty acid (with a neutralization value of 182) and 2.7 parts of dimethylamino ethanol were added to the resulting solution and further reacted for 8 hours. After the acid value reached 1 or less, xylene was removed from the solution under a reduced pressure and the solution was cooled. As a result, an aromatic polyol resin having an epoxy equivalent of not less than 50,000 was obtained. The resin had a number average molecular weight of 4,000 with an average of 0.07 epoxy group and 0.5 primary hydroxyl group in one molecule.

Preparation of a carboxyl group-containing acrylic resin

A four-neck flask replaced with a nitrogen gas was charged with 500 parts of ethylene glycol monobutyl ether and heated to 150° C. to 160° C. While this temperature was maintained, a uniform solution prepared by mixing 120 parts of styrene, 70 parts of ethyl acrylate and 300 parts of methacrylic acid was dripped into the four-neck flask over 2 hours and stirred for 4 hours at that temperature after completion of dripping. Thereafter, the resulting reaction product was added to 2,000 parts of xylene and cooled to room temperature. Further a precipitated resin was collected by means of decantation and 1,000 parts of xylene was added to wash the resin. This operation was repeated twice and the resin collected by means of decantation was dried for 6 hours at 150° C. at a reduced pressure. As a result, a carboxyl group-containing acrylic resin having a number average molecular weight of 1,000, a carboxylic acid unit of 52% and an acid value of 320 was obtained.

Preparation of a composition for water-based coating

In the same manner as in Example 1, the aromatic polyol resin and the carboxyl group-containing acrylic resin prepared by the above-described methods were used to prepare a composition for water-based coating. Thereby a semitranslucent dispersion having a solid content of 25%, a viscosity of 220 cpc and a particle size of 0.3 μm was obtained. This resulting dispersion was preserved for 6 months at 50° C., but no change was observed. The ratio of component (A-1) to component (B) in the solid content was 1:1 and that of component (C) to component (D) was 2:3.

EXAMPLE 4

A composition for water-based coating was prepared in the same manner as in Example 2 except that the aromatic polyol resin prepared in Example 3 was used, whereby a semitranslucent dispersion having a solid content of 21%, a viscosity of 50 cpc and a particle size of 0.2 μm was obtained. This resulting dispersion was preserved for 6 months at 50° C., but no change was observed. The ratio of component (A-1) to component (B) in the solid content was 2:1 and that of component (C) to component (D) was 3:2.

Comparative Example 3

Ethylene glycol monobutyl ether, n-butyl alcohol, 2-dimethylamino ethanol and ion-exchange water were added to prepare a composition for water-based coating in the same manner as in Example 3 except that the aromatic polyol resin and the carboxyl group-containing acrylic resin obtained in Example 3 and bisphenol A type epoxy resin were used, and they were only mixed but not reacted. No water dispersion was obtained.

The results of the retort resistance, processability, corrosion resistance, adhesion, gel content percentage and MEK resistance of the above-described Examples 1 to 4 and Comparative Examples 1 to 3 are shown in the Table 1 below.

TABLE 1

| | Baking condition °C. × min | Film thickness m | Heat retort resistance | | | Processability | | | Corrosion resistance | Adhesion (number of squares/ 100) | Gel content percentage | MEK resistance |
|---|---|---|---|---|---|---|---|---|---|---|---|---|
| | | | Blanching | Adhesion | | | | | | | | |
| | | | | Squares | No square | 0T | 1T | 2T | | | | |
| Example 1 | 200 × 5 | 6 | No | 100 | No change | 1 | 1 | 3 | ⊙ | 100 | 93.7 | 100 or more |
| Example 2 | 200 × 5 | 7 | No | 100 | No change | 0 | 1 | 2 | ⊙ | 100 | 87.0 | 80 |
| Example 3 | 200 × 5 | 6 | No | 100 | No change | 2 | 1 | 3 | ⊙ | 100 | 94.4 | 100 or more |
| Example 4 | 200 × 5 | 7 | No | 100 | No change | 0 | 1 | 2 | ⊙ | 100 | 90.1 | 85 |
| Comp. Example 2 | 200 × 5 | 6 | No | 100 | No change | 0 | 1 | 1 | X | 100 | 69 | 4 |

EXAMPLE 5

A four-neck flask replaced with a nitrogen gas was charged with 125 parts of the aromatic polyol resin prepared in Example 3, 375 parts of the carboxyl group-containing acrylic resin prepared in Example 1, 1,250 parts of ethylene glycol monobutyl ether, and 0.7 g of titanium tetrabuthoxide monomer, and gradually heated to elevate the temperature inside the flask up to 165° C. Thereafter, these materials were reacted for 6 hours at that temperature, and 2,000 parts of bisphenol A type epoxy resin (with a number average molecular weight of 3,200 and an epoxy equivalent of 2,700) and 1,250 parts of n-butyl alcohol were added to and dissolved in the resulting reaction product and cooled up to 100° C. Then 191 parts of 2-dimethylamino ethanol was added to the resulting solution and stirred for 30 minutes at that temperature. Further, 6,650 parts of ion-exchange water was added to the resulting mixture little by little and stirred using a dispersion mixer. Thereby, a semitranslucent dispersion having a solid content of 21%, a viscosity of 50 cpc and a particle size of 0.3 μm was obtained. This resulting dispersion was preserved for 6 months at 50° C., but no change was observed. The ratio of component (A-1) to component (B) in the solid content was 1:3 and that of component (C) to component (D) was 1:4.

EXAMPLE 6

A four-neck flask replaced with a nitrogen gas was charged with 375 parts of the aromatic polyol resin prepared in Example 3, 375 parts of the carboxyl group-containing acrylic resin prepared in Example 1, 1,250 parts of ethylene glycol monobutyl ether and 1.1 g of titanium tetrabuthoxy monomer, and gradually heated to elevate the temperature inside the flask up to 165° C. Thereafter, these materials were reacted for 6 hours at that temperature, and 1,750 parts of bisphenol A type epoxy resin (with a number average molecular weight of 3,200 and an epoxy equivalent of 2,700) and 1,250 parts of n-butyl alcohol were added to and dissolved in the resulting reaction product, and cooled up to 100° C. Then 191 parts of 2-dimethylamine ethanol was added to the resulting solution and stirred for 30 minutes at that temperature. Further, 6,650 parts of ion-exchange water was added to the resulting mixture little by little and stirred using a dispersion mixer. Thereby, a semitranslucent dispersion having a solid content of 21%, a viscosity of 40 cpc and a particle size of 0.3 μm was obtained. This resulting dispersion was preserved for 6 months at 50° C., but no change was observed. The ratio of component (A-1) to component (B) in the solid content was 1:1 and that of component (C) to component (D) was 3:7.

EXAMPLE 7

A four-neck flask replaced with a nitrogen gas was charged with 500 parts of the aromatic polyol resin prepared in Example 3, 500 parts of the carboxyl group-containing acrylic resin prepared in Example 1, 1,250 parts of ethylene glycol monobutyl ether and 1.4 g of titanium tetrabutoxide monomer, and gradually heated to elevate the temperature inside the flask up to 165° C. Thereafter, these materials were reacted for 6 hours at that temperature, and 1,000 parts of bisphenol A type epoxy resin (with a number average molecular weight of 3,200 and an epoxy equivalent of 2,700), 500 parts of the aromatic polyol resin prepared in Example 3, and 1,250 parts of n-butyl alcohol were added to and dissolved in the resulting reaction product and then cooled up to 100° C. Then 254 parts of 2-dimethylamino ethanol was added to the resulting solution and stirred for 30 minutes at that temperature. Further, 6,650 parts of ion-exchange water was added to the resulting mixture little by little using a dispersion mixer. Thereby, a semitranslucent dispersion having a solid content of 21%, a viscosity of 60 cpc and a particle size of 0.3 μm was obtained. This resulting dispersion was preserved for 6 months at 50° C., but no change was observed. The ratio of component (A-1) to component (B) in the solid content was 1:1, and the component (C)/component (D)/component (A-2) ratio was 2:2:1.

TABLE 2

| | Baking condition °C. × min | Film thickness μm | Heat retort resistance | | | | | | Corrosion resistance | Adhesion (number of squares/100) | Gel content percentage | MEK resistance |
|---|---|---|---|---|---|---|---|---|---|---|---|---|
| | | | Blanching | Adhesion | | Processability | | | | | | |
| | | | | Squares | No square | 0T | 1T | 2T | | | | |
| Example 5 | 200 × 5 | 6 | No | 100 | No change | 0 | 1 | 2 | ⊙ | 100 | 93.5 | 50 |
| Example 6 | 200 × 5 | 6 | No | 100 | No change | 1 | 1 | 2 | ⊙ | 100 | 91.0 | 80 |
| Example 7 | 200 × 5 | 7 | No | 100 | No change | 1 | 1 | 3 | ⊙ | 100 | 92.1 | 90 |

What is claimed is:

1. A resin composition for water-based coating which is a resin mixture consisting essentially of:

(1) a reaction product (C) of an aromatic polyol resin (A-1) and a carboxyl group-containing acrylic resin (B);

(2) an aromatic epoxy resin (D); and (3) an aromatic polyol resin (A-2);

wherein said aromatic polyol resin (A-1) and said aromatic polyol resin (A-2), which may be the same or different, are obtained by capping the epoxy group of an aromatic epoxy resin, the weight ratio of component (A-1) to component (B) satisfying the following expression (I), and the proportion of component (D) and component (A-2) satisfying the following expressions (II) and (III) based on 100 parts by weight of the resin mixture:

$$85/15 \geqq (A\text{-}1)/B \geqq 15/85 \tag{I}$$

$$1 \leqq (D)+(A\text{-}2) \leqq 80 \tag{II}$$

$$1 \leqq (D) \leqq 80 \tag{III}.$$

2. A resin composition for water-based coating according to claim 1, wherein said aromatic polyol resins (A-1) and (A-2) have a number average molecular weight of 350 to 40,000 and contain an average of 0.01 to 4.0 primary hydroxyl groups in one molecule.

3. A resin composition for water-based coating according to claim 2, wherein said aromatic polyol resins (A-1) and (A-2) contain substantially no epoxy group in their molecules.

4. A resin composition for water-based coating according to claim 1, wherein said carboxyl group-containing acrylic resin (B) has a number average molecular weight of 300 to 60,000 and an acid value of 25 to 450.

5. A resin composition for water-based coating according to claim 1, wherein said aromatic epoxy resin (D) has a number average molecular weight of 350 to 40,000 and contains an average of 1.1 to 2.0 epoxy groups in one molecule.

6. A resin composition for water-based coating according to claim 1, wherein said resin composition contains substantially no free carboxyl group.

7. A resin composition for water-based coating according to claim 1, wherein said resin composition has pH of 5 to 11.

8. A resin composition for water-based coating according to claim 1, wherein the weight ratio of component (A-1) to component (B) satisfies the following expressing (I'):

$$80/20 \geqq (A\text{-}1)/B \geqq 40/60 \tag{I'}$$

9. A resin composition for water-based coating according to claim 1, wherein the proportions of component D and component (A-2) satisfy the following expressions (II') and (III') in terms of the total weight of said resin mixture being 100.

$$30 \leqq (D) + (A\text{-}2) \leqq 70 \tag{II'}$$

$$20 \leqq (D) \leqq 70 \tag{III'}$$

10. A water-based coating composition consisting essentially of said resin composition for water-based coating claimed in claim 1 and an aqueous medium.

11. A water-based coating composition according to claim 10, wherein the weight ratio of said resin composition for water-based coating to said aqueous medium is in the range from 5/95 to 50/50.

12. A method for coating a metal can comprising:

applying a coating of said water-based coating composition as claimed in claim 10 to a can; and baking said coating.

* * * * *

UNITED STATES PATENT AND TRADEMARK OFFICE
CERTIFICATE OF CORRECTION

PATENT NO. : 5500246
DATED : March 19, 1996
INVENTOR(S) : Morizono, et al

It is certified that error appears in the above-identified patent and that said Letters Patent is hereby corrected as shown below:

On the title page, item [73], Assignee: insert -- Mitsui Petrochemical Industries, Ltd., Tokyo, Japan--

Signed and Sealed this

Twenty-fifth Day of February, 1997

*Attest:*

BRUCE LEHMAN

*Attesting Officer*     *Commissioner of Patents and Trademarks*